(12) United States Patent
Choi et al.

(10) Patent No.: US 12,491,954 B2
(45) Date of Patent: Dec. 9, 2025

(54) DRIVING APPARATUS HAVING TRANSFORMABLE WHEEL

(71) Applicant: RESEARCH & BUSINESS FOUNDATION SUNGKYUNKWAN UNIVERSITY, Suwon-si (KR)

(72) Inventors: Hyouk Ryeol Choi, Suwon-si (KR); Ye Chan Lee, Suwon-si (KR); Heesik Jang, Suwon-si (KR); Tae Yu Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 746 days.

(21) Appl. No.: 17/826,488

(22) Filed: May 27, 2022

(65) Prior Publication Data

US 2022/0379980 A1    Dec. 1, 2022

(30) Foreign Application Priority Data

May 27, 2021    (KR) .......................... 10-2021-0068589

(51) Int. Cl.
*B62D 55/12*    (2006.01)
(52) U.S. Cl.
CPC ................................... *B62D 55/12* (2013.01)
(58) Field of Classification Search
CPC ..................................................... B62D 55/12

USPC ........................................................... 180/6.7
See application file for complete search history.

(56) References Cited

U.S. PATENT DOCUMENTS

| | | | |
|---|---|---|---|
| 11,829,148 B1 * | 11/2023 | Ebrahimi Afrouzi | ........................ A47L 11/4061 |
| 2011/0100733 A1 * | 5/2011 | Lin | ........................ B62D 57/022 901/1 |
| 2014/0158439 A1 * | 6/2014 | Kim | ........................ B62D 57/028 901/1 |
| 2020/0205338 A1 * | 7/2020 | Zeiler | ........................ B62D 21/11 |

FOREIGN PATENT DOCUMENTS

| | | | | |
|---|---|---|---|---|
| CN | 108708948 A | * | 10/2018 | ............... F16H 9/10 |
| JP | H10129517 A | * | 5/1998 | |
| KR | 10-1386011 B1 | | 4/2014 | |
| KR | 20170060232 A | * | 6/2017 | ............. B60K 17/35 |

* cited by examiner

*Primary Examiner* — Valentin Neacsu
*Assistant Examiner* — Mohamed M Medani
(74) *Attorney, Agent, or Firm* — NSIP Law

(57) ABSTRACT

A driving apparatus having transformable wheels including: a drive unit generating forward/reverse torque; a wheel assembly traveling on the ground by receiving torque from the drive unit, the wheel assembly being variable in a diameter; a power transmission transmitting the forward/reverse torque generated by the drive unit to the wheel assembly in only one direction; and a mode switching unit changing the diameter of the wheel assembly depending on a rotation direction of the drive unit.

18 Claims, 11 Drawing Sheets

DRIVING APPARATUS HAVING
TRANSFORMABLE WHEEL

CROSS-REFERENCE TO RELATED
APPLICATION

This application claims priority from and the benefit of Korean Patent Application No. 10-2021-0068589, filed on May 27, 2021, which is hereby incorporated by reference for all purposes as if set forth herein.

FIELD

The present invention relates to a driving apparatus having transformable wheels and, more particularly, to a driving apparatus having transformable wheels driven by a single motor.

BACKGROUND

In general, a round wheel, which has advantages of fast driving speed, is widely used as a rotating body driven by a drive device. However, such a round wheel has a problem of difficulty in moving on a rough road with obstacles.

Accordingly, driving apparatuses are being developed which can change the mode of driving wheels through adjustment of the diameter of a rotating body so as to overcome a rough road. However, conventional driving apparatuses having a transformable rotating body have a problem in that multiple motors are required to perform both maintenance of traveling direction and mode change of driving wheels, thus causing excessive costs and increase in structural complexity.

The background technique of the present invention is disclosed in Korean Patent Registration No. 10-1386011 (registered on Apr. 10, 2014, title of invention: PASSIVE TRANSFORMABLE WHEEL AND ROBOT HAVING THE WHEEL).

SUMMARY

It is an object of the present invention to provide a driving apparatus having transformable wheels, which can provide different modes of forward driving with only one motor.

In accordance with one aspect of the present invention, a driving apparatus having transformable wheels includes: a drive unit generating forward/reverse torque; a wheel assembly traveling on the ground by receiving torque from the drive unit, the wheel assembly being variable in a diameter; a power transmission transmitting the forward/reverse torque generated by the drive unit to the wheel assembly in only one direction; and a mode switching unit changing the diameter of the wheel assembly depending on a rotation direction of the drive unit.

The power transmission may be disposed between the drive unit and the wheel assembly, and the mode switching unit may be disposed between the power transmission and the wheel assembly.

The wheel assembly may include: a pair of inner wheels; multiple outer wheels rotated in conjunction with the inner wheel and connected to the inner wheel to be slidable in a radial direction of the inner wheel; and a diameter adjustment portion extending from the outer wheel and sliding the outer wheel with external force applied from the mode switching unit.

The multiple outer wheels may be arranged in a circumferential direction of the inner wheel.

The diameter adjustment portion may extend in a direction parallel to a central shaft of the wheel assembly and may have opposite ends respectively connected to a pair of outer wheels disposed on the respective inner wheels.

The power transmission may include: a pair of first power transmission members rotated in opposite directions by torque of the drive unit; a pair of second power transmission members connected to the mode switching unit and rotated by torque received from the respective first power transmission members; and a transmission adjustment portion disposed between the first power transmission member and the second power transmission member to selectively permit torque transmission between the first power transmission member and the second power transmission member depending on a rotation direction of the first power transmission member.

The pair of first power transmission members may be engaged with opposite sides of an output gear rotated in conjunction with an output shaft of the drive unit, respectively.

The transmission adjustment portion may be a one-way bearing.

The mode switching unit may include: a first mode switching member connected to one of the pair of second power transmission members and rotated by the forward torque of the drive unit to reduce the diameter of the wheel assembly; and a second mode switching member connected to the other second power transmission member and rotated by the reverse torque of the drive unit to extend the diameter of the wheel assembly.

The first mode switching member and the second mode switching member may be rotated in a same direction to reduce or extend the diameter of the wheel assembly.

The first mode switching member may rotate the second mode switching member and the wheel assembly in a first direction after reducing the diameter of the wheel assembly while rotating in the first direction.

The second mode switching member may rotate the first mode switching member and the wheel assembly in a first direction after extending the diameter of the wheel assembly while rotating in the first direction.

The first mode switching member may include: a first wheel gear meshed with one of the pair of second power transmission members; and a first guide extending in a radial direction of the first wheel gear to be curved with a predetermined curvature and allowing the diameter adjustment portion to be slidably connected to the first guide, and the second mode switching member may include: a second wheel gear meshed with the other second power transmission member; and a second guide extending in a radial direction of the second wheel gear to be curved with a curvature opposite to the curvature of the first guide and allowing the diameter adjustment portion to be slidably connected to the second guide.

The first guide may include multiple first guides arranged at certain intervals in a circumferential direction of the first wheel gear and the second guide may include multiple second guides arranged at certain intervals in a circumferential direction of the second wheel gear.

The first guide may allow the diameter adjustment portion to slide toward a central shaft of the inner wheel when the first wheel gear is rotated in a first direction by the second power transmission member.

The second guide may allow the diameter adjustment portion to slide in a direction away from a central shaft of the inner wheel when the second wheel gear is rotated in a first direction by the second power transmission member.

With the wheel assembly variable in diameter depending on direction of torque generated by the drive unit, the driving apparatus according to the present invention can travel on the ground while smoothly overcoming a steep slope or rough terrain with obstacles.

In addition, with the transmission adjustment portion of the power transmission allowing forward/reverse torque generated by the drive unit to be transmitted to the wheel assembly in only one direction, the driving apparatus according to the present invention can allow the wheel assembly to maintain a traveling direction thereof at all times.

Further, with the mode switching unit allowing both maintenance of traveling direction of the wheel assembly and diameter change of the wheel assembly to be achieved with a single drive unit, the driving apparatus according to the present invention can have a simplified structure, thereby allowing reduction in manufacturing cost.

DRAWINGS

DETAILED DESCRIPTION

Figure 1:
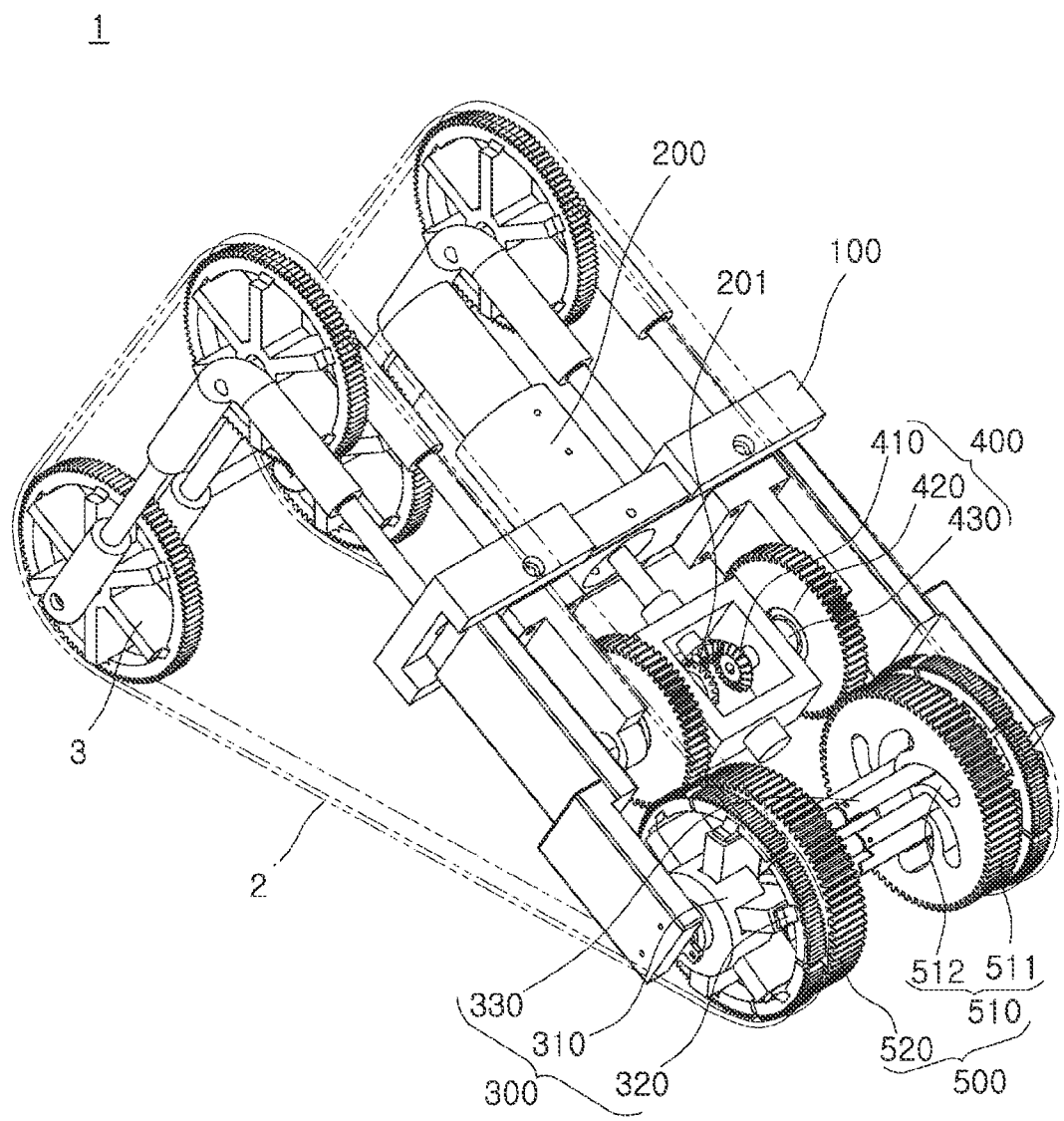
FIG. 1 is a schematic perspective view of a driving apparatus having transformable wheels according to one embodiment of the present invention.

Hereinafter, embodiments of the present invention will be described with reference to the accompanying drawings.

In the accompanying drawings, the thickness of lines and the size of components may be exaggerated for clarity and descriptive purposes. In addition, terms to be described below are defined in consideration of functions in the present invention, and may vary according to the intention or practice of a user or an operator. Therefore, such terms should be defined based on the entire content disclosed herein.

When an element is referred to as being "connected to (or on)" another element, it may be directly connected to (or on) the other element, or may be indirectly connected to (or on) the other element with a different element interposed therebetween. In addition, unless stated otherwise, the terms "includes", "comprises", "including" and/or "comprising" should be interpreted as not excluding the presence of other components than those listed herein. That is, when an element is referred to as including (or comprising) a certain component, the element may further include (or comprise) other components apart from the certain component.

Further, like components will be denoted by like reference numerals throughout the specification. Even when there are like reference numerals not shown or described in a certain drawing, the reference numerals may be described with reference to other drawings. In addition, even when there are components not denoted by reference numeral in a certain drawing, these components may be described with reference to other drawings. Further, the number, shape, size, and relative sizes of components shown in the drawings are merely given for convenience of understanding and thus may be implemented in various other ways without limiting the embodiments of the invention.

Figure 2:
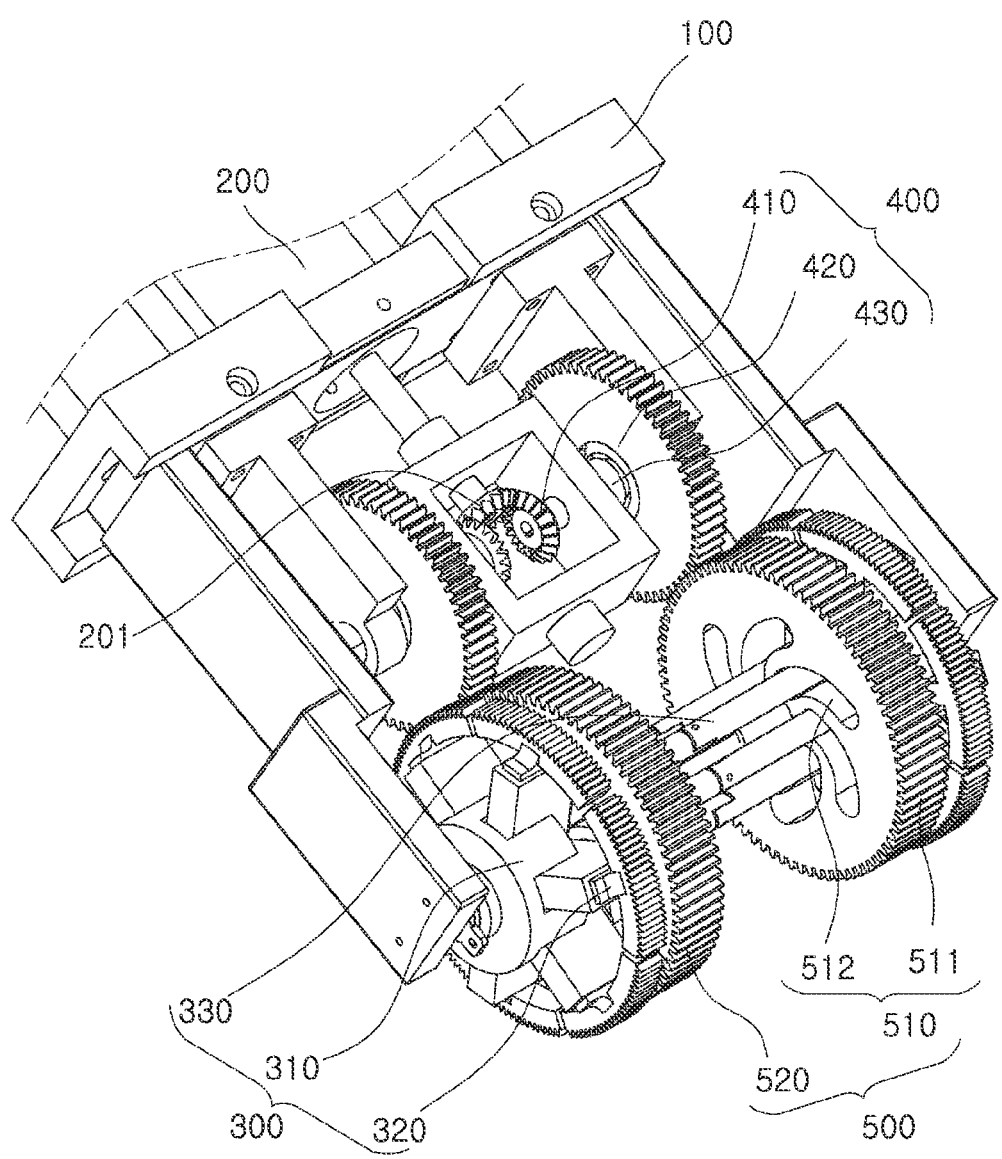
FIG. 2 is a schematic enlarged perspective view of the driving apparatus having transformable wheels according to the embodiment.
Figure 3:
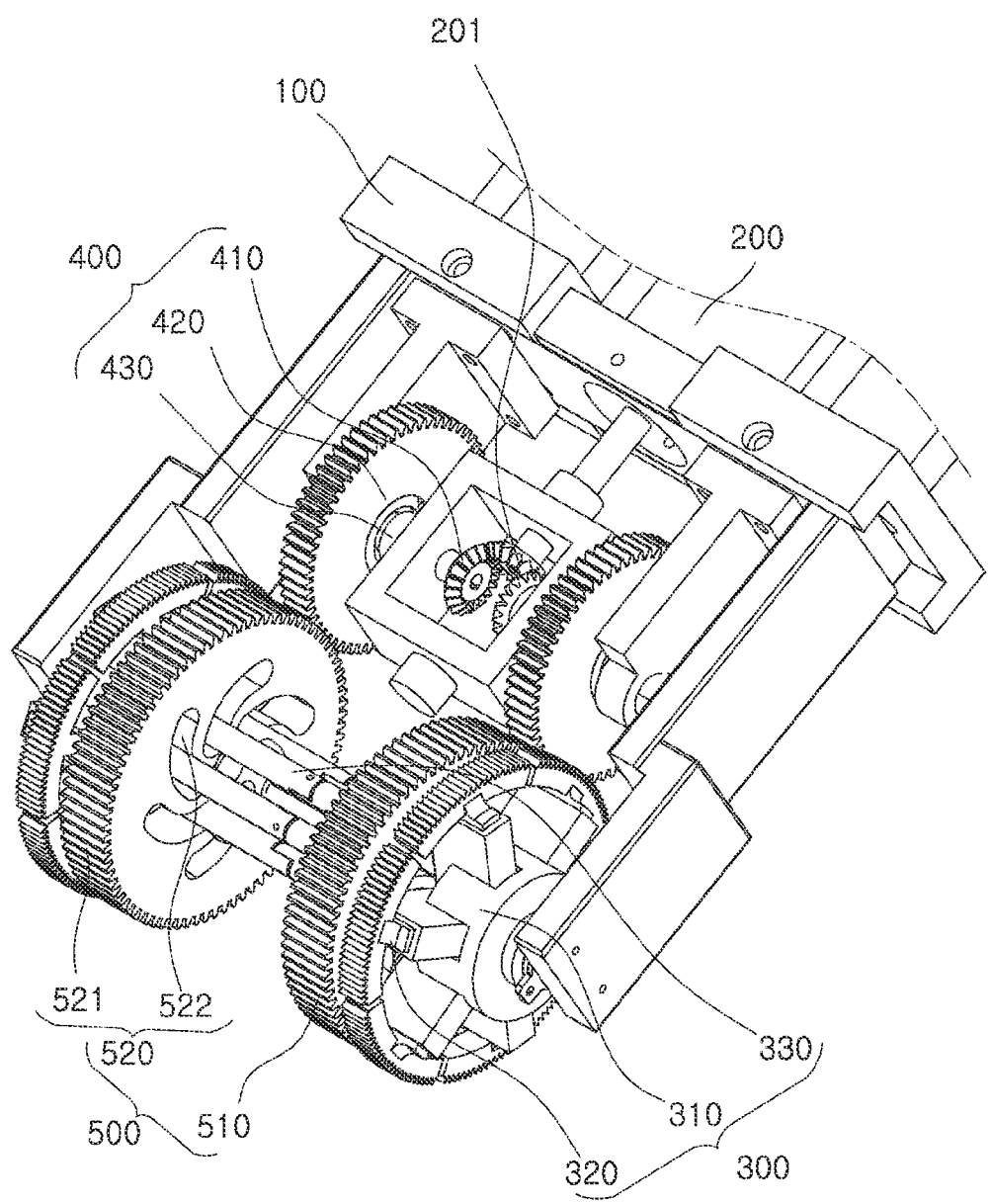
FIG. 3 is another enlarged perspective view of the driving apparatus having transformable wheels according to the embodiment, drawn from a different point of view than FIG. 2.
Figure 4:
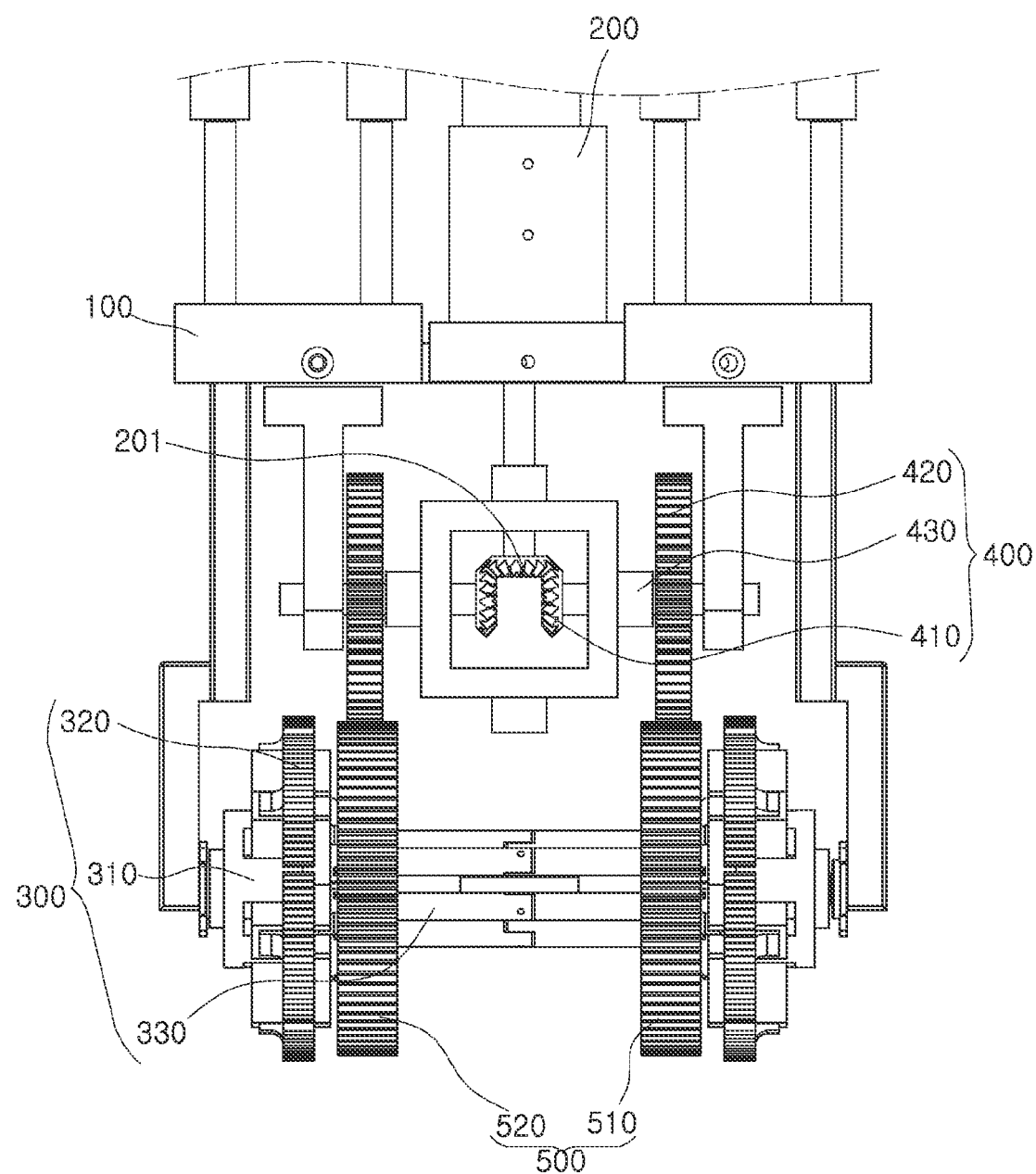
FIG. 4 is a schematic front view of the driving apparatus having transformable wheels according to the embodiment.
Figure 5:
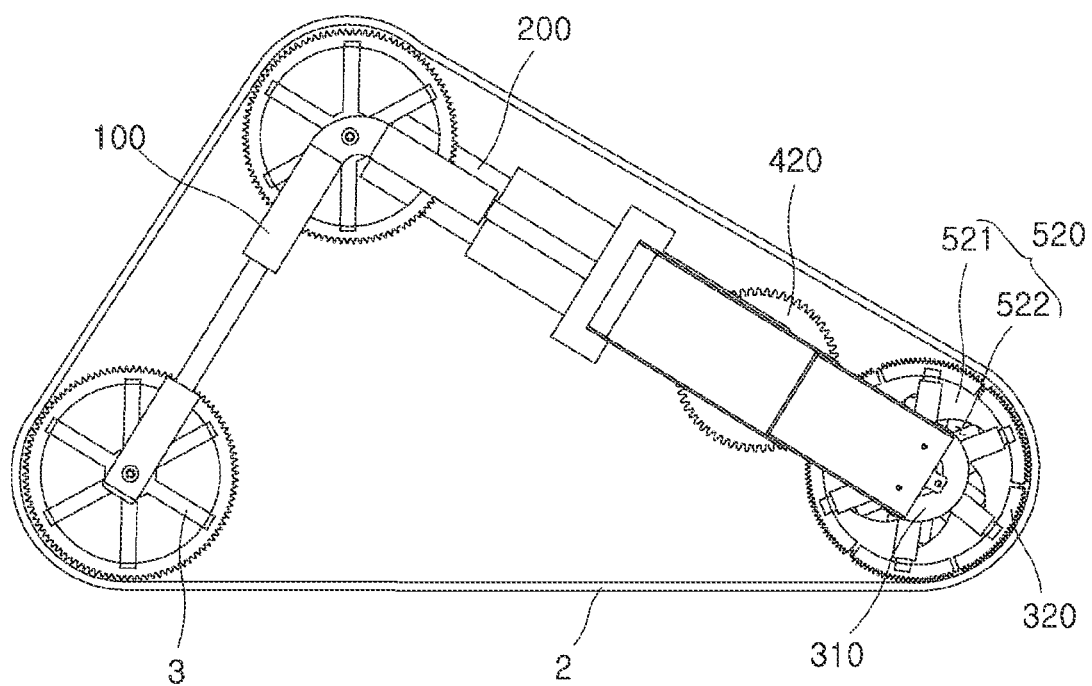
FIG. 5 is a schematic side view of the driving apparatus having transformable wheels according to the embodiment.

FIG. 1 is a schematic perspective view of a driving apparatus having transformable wheels according to one embodiment of the present invention, FIG. 2 is a schematic enlarged perspective view of the driving apparatus having transformable wheels according to the embodiment, FIG. 3 is another enlarged perspective view of the driving apparatus having transformable wheels according to the embodiment, drawn from a different point of view than FIG. 2, FIG. 4 is a schematic front view of the driving apparatus having transformable wheels according to the embodiment, and FIG. 5 is a schematic side view of the driving apparatus having transformable wheels according to the embodiment.

Referring to FIG. 1 to FIG. 5, a driving apparatus 1 having transformable wheels according to one embodiment of the present invention includes a frame 100, a drive unit 200, a wheel assembly 300, a power transmission 440, and a mode switching unit 500.

The frame 100 defines a general external appearance of the driving apparatus 1 and generally supports the drive unit 200, the wheel assembly 300, and the power transmission 400 described below. The frame 100 may include a material having high rigidity, such as metals (for example, aluminum) and synthetic resins, to avoid damage due to weight of each of the aforementioned components or vibration applied thereto during traveling of the driving apparatus 1. Although a specific shape of the frame 100 is shown in FIG. 1 to FIG. 5, it should be understood that the present invention is not limited thereto and the frame 100 may have any suitable shape for generally supporting each of the aforementioned components of the driving apparatus 1.

The drive unit 200 is disposed on the frame 100 and generates forward/reverse torque. In one embodiment, the drive unit 200 may be, for example, an electric motor that is powered by an external power supply and generates torque in opposite directions.

The drive unit 200 may be provided at an output shaft thereof with an output gear 201 transmitting torque generated by the drive unit 200 to the power transmission 400 described below. In one embodiment, the output gear 201 may be provided in the form of a bevel gear connected to an end of the output shaft of the drive unit 200 to be rotatable in conjunction with the output shaft of the drive unit 200.

The wheel assembly 300 travels on the ground by receiving torque generated by the drive unit 200 through the power transmission 400 and the mode switching unit 500 described below. The wheel assembly 300 is variable in diameter depending on direction of torque generated by the drive unit 200. Thus, the wheel assembly 300 can travel on the ground while smoothly overcoming a steep slope or rough terrain with obstacles.

Figure 6:
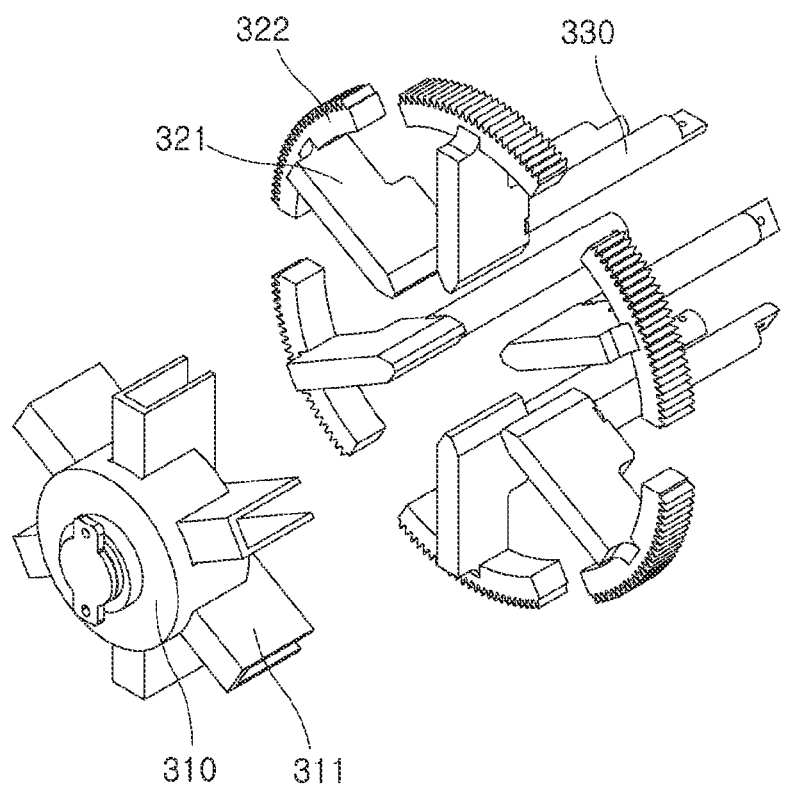
FIG. 6 is a schematic exploded perspective view of a wheel assembly according to one embodiment of the present invention.

FIG. 6 is a schematic exploded perspective view of the wheel assembly according to one embodiment of the present invention.

Referring to FIG. 1 to FIG. 6, the wheel assembly 300 according to this embodiment includes an inner wheel 310, an outer wheel 320, and a diameter adjustment portion 330.

The inner wheel 310 is rotatably mounted on the frame 100. In one embodiment, the inner wheel 310 is connected to the frame 100 by a central shaft extending in a direction parallel to a transverse direction of the frame 100. The inner wheel 310 is rotated about the central shaft or in conjunction with the central shaft by torque generated by the drive unit 200. The inner wheel 310 may include a pair of inner wheels separated a predetermined distance from each other in the transverse direction of the frame 100.

The inner wheel 310 may include an insertion portion 311. In one embodiment, the insertion portion 311 extends from the central shaft of the inner wheel 310 in a radial direction of the inner wheel 310. The insertion portion 311 has a hollow inside such that the outer wheel 320 described below can be slidably coupled thereto. The insertion portion 311 includes multiple insertion portions arranged at certain intervals in a circumferential direction of the inner wheel 310.

The outer wheel 320 is supported by the inner wheel 310 and is rotated in conjunction with rotation of the inner wheel 310. The outer wheel 320 is connected to the inner wheel 310 to be slidable in the radial direction of the inner wheel 310. The outer wheel 320 may include multiple outer wheels 320 arranged in the circumferential direction of the inner wheel 310. When the inner wheel 310 includes a pair of inner wheels, each of the pair of inner wheels 310 may individually have the multiple outer wheels 320 connected thereto.

In one embodiment, the outer wheel 320 may include a spoke 321 and a wheel member 322.

The spoke 321 is provided in the form of a bar and is inserted into the insertion portion 311. The spoke 321 includes multiple spokes 321 slidably inserted into the respective insertion portions 311. The spoke 321 reduces or extends the diameter of the wheel assembly 300 while sliding in a direction parallel to a longitudinal direction of the insertion portion 311 by receiving external force from the diameter adjustment portion 330 described below.

The wheel member 322 is disposed at an end of the spoke 321 and is provided in the form of an arc having a predetermined curvature. The wheel member 322 includes multiple wheel members disposed at respective ends of the multiple spokes 321. The multiple wheel members 322 are moved in the radial direction of the wheel assembly 300 by sliding of the respective spokes 321. The multiple wheel members 322 are continuously or discontinuously arranged along a circumference corresponding to the diameter of the wheel assembly 300. Upon rotation of the inner wheel 310, the wheel member 322 may travel on the ground while directly contacting the ground, or may travel on the ground by rotating a continuous track wrapped around outer circumferential surfaces of the wheel member 322 and an auxiliary wheel 3, as shown in FIG. 1.

The diameter adjustment portion 330 extends from the outer wheel 320. The diameter adjustment portion 330 changes the diameter of the wheel assembly 300 by sliding the outer wheel 320 while rotating the wheel assembly 300 by external force applied from the mode switching unit 500 described below. The diameter adjustment portion 330 includes multiple diameter adjustment portions extending from the respective multiple outer wheels 320. In one embodiment, the diameter adjustment portion 330 may be provided in the form of a rod extending in a direction parallel to the central shaft of the wheel assembly 300. The diameter adjustment portion 330 is slidably inserted into a first guide 512 and a second guide 522 of the mode switching unit 500 described below. When the inner wheel 310 includes a pair of inner wheels 310, opposite ends of the diameter adjustment portion 330 may be connected to respective outer wheels 320 disposed on the pair of inner wheels 310. In order to facilitate assembly of the wheel assembly, the diameter adjustment portion 330 may be separated into two pieces at the center thereof, as shown in FIG. 6.

The power transmission 400 is disposed between the drive unit 200 and the wheel assembly 300 and transmits forward/reverse torque generated by the drive unit 200 to the wheel assembly 300 in only one direction. That is, the power transmission 400 allows the wheel assembly 300 to travel in a constant direction regardless of direction of torque generated by the drive unit 200. Here, the traveling direction of the wheel assembly 300 may be, for example, a forward direction with respect to the ground. Accordingly, the power transmission 400 can allow the wheel assembly 300 to be changed in diameter by the mode switching unit 500 described below while maintaining the traveling direction thereof.

Figure 7:
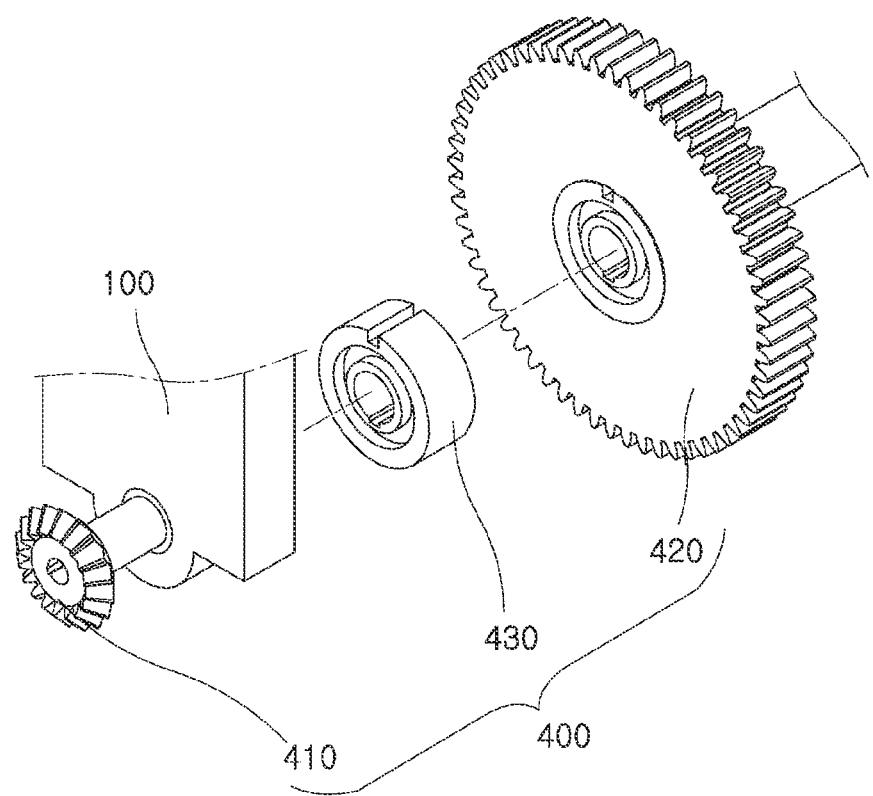
FIG. 7 is a schematic exploded perspective view of a power transmission according to one embodiment of the present invention.

FIG. 7 is a schematic exploded perspective view of the power transmission 400 according to one embodiment of the present invention.

Referring to FIG. 1 to FIG. 7, the power transmission 400 according to this embodiment includes a first power transmission member 410, a second power transmission member 420, and a transmission adjustment portion 430.

The first power transmission member 410 is connected to the drive unit 200 and is rotated by torque of the drive unit 200. The first power transmission member 410 includes a pair of first power transmission members connected to respective opposite sides of the drive unit to be rotated in opposite directions. In one embodiment, the first power transmission member 410 may be provided in the form of a bevel gear meshed with the output gear 201 connected to the output shaft of the drive unit 200. The first power transmission member 410 may have a central shaft rotatably supported on the frame 100. The pair of first power transmission members 410 is engaged with respective opposite sides of the output gear 201. The pair of first power transmission members 410 is rotated in opposite directions upon rotation of the output gear 201. That is, when one of the pair of first power transmission members 410 is rotated clockwise, the other one is rotated counterclockwise.

The second power transmission member 420 is rotated by torque transmitted from the first power transmission member 410. The second power transmission member 420 is connected to the mode switching unit 500 to transmit the torque received from the first power transmission member 410 to the mode switching unit 500. In one embodiment, the second power transmission member 420 may be provided in the form of a spur gear having a central shaft coaxial with the central shaft of the first power transmission member 410. The second power transmission member 420 is disposed outside the first power transmission member 410 in the transverse direction of the frame 100. The central axis of the second power transmission member 420 may be rotatably supported on the frame 100. The second power transmission member 420 is connected to the first power transmission member 410 via the transmission adjustment portion 430 described below. The second power transmission member 420 includes a pair of second power transmission members respectively connected to the pair of first power transmission members 410. Respective outer circumferential surfaces of the pair of second power transmission members 420 are engaged with a first wheel gear 511 and a second wheel gear 521 of the mode switching unit 500 described below, respectively.

The transmission adjustment portion 430 is disposed between the first power transmission member 410 and the second power transmission member 420 to connect the first power transmission member 410 to the second power transmission member 420. The transmission adjustment portion 430 selectively permits torque transmission between the first power transmission member 410 and the second power transmission member 420 depending on the rotation direction of the first power transmission member 410. In one embodiment, the transmission adjustment portion 430 may be, for example, a one-way bearing including inner and outer rings, relative rotation of which is permitted or prevented depending on the rotation direction of the inner ring. The inner ring of the transmission adjustment portion 430 is press-fitted to the central shaft of the first power transmission member 410 and the outer ring of the transmission adjustment portion 430 is press-fitted to an inner circumferential surface of the second power transmission member 420. When the first power transmission member 410 is rotated in one direction (counterclockwise in FIG. 2), the transmission adjustment portion 430 is switched to a position preventing relative rotation of the inner and outer rings to transmit torque of the first power transmission member 410 to the second power transmission member 420. When the first power transmission member 410 is rotated in the other direction (clockwise in FIG. 2), the transmission adjustment portion 430 is switched to a position permitting relative rotation of the inner and outer rings to prevent transmission of torque of the first power transmission member 410 to the second power transmission member 420. That is, the transmission adjustment portion 430 allows torque of the drive unit 200 to be transmitted only to the second power transmission member 420 connected to the first power transmission member 410 rotated in the one direction (counterclockwise in FIG. 2) among the pair of first power transmission members 410. Accordingly, regardless of direction of torque generated by the drive unit 200, the transmission adjustment portion 430 allows the torque to be applied to the wheel assembly 300 in the one direction at all times, thereby allowing the wheel assembly 300 to maintain the traveling direction thereof.

The mode switching unit 500 is disposed between the power transmission 400 and the wheel assembly 300. The mode switching unit 500 finally transmits driving force generated by the drive unit 200 to the wheel assembly 300 to drive the wheel assembly 300 while changing the diameter of the wheel assembly 300 depending on the rotation direction of the drive unit 200.

Figure 8A:
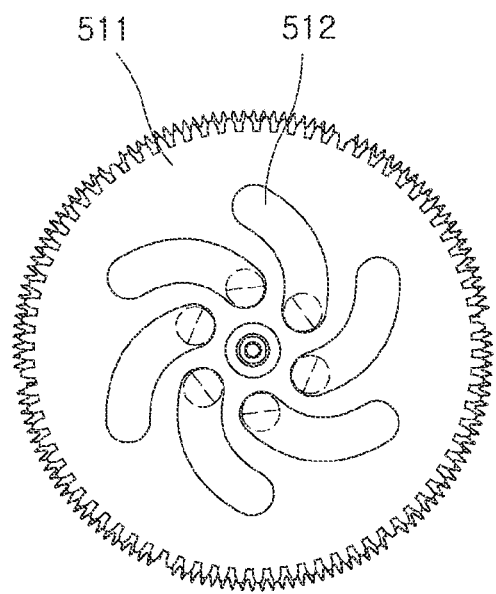
FIGS. 8A and 8B are a schematic view of a mode switching unit according to one embodiment of the present invention.
Figure 8B:
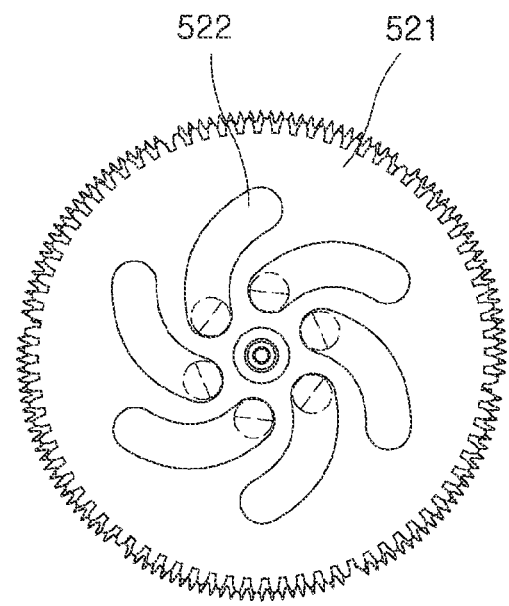

FIGS. 8A and 8B are a schematic view of the mode switching unit according to one embodiment of the present invention.

Referring to FIG. 1 to FIG. 8B, the mode switching unit 500 according to this embodiment includes a first mode switching member 510 and a second mode switching member 520.

The first mode switching member 510 is connected to one of the pair of second power transmission members 420. The first mode switching member 510 is rotated in a first direction by forward torque of the drive unit 200 to reduce the diameter of the wheel assembly 300. After reducing the diameter of the wheel assembly 300, the first mode switching member 510 rotates both the second mode switching member 520 and the wheel assembly 300 in the first direction to drive the wheel assembly 300 in the traveling direction thereof. Here, the first direction is a direction that allows the wheel assembly 300 to travel forward, and may be, for example, a clockwise direction in FIG. 2.

In one embodiment, the first mode switching member 510 includes a first wheel gear 511 and a first guide 512.

The first wheel gear 511 is meshed with one of the pair of second power transmission members 420. In one embodiment, the first wheel gear 511 is provided in the form of a spur gear and has an outer peripheral surface engaged with one of the pair of second power transmission members 420 (the second power transmission members on the right in FIG. 2). The first wheel gear 511 is disposed inside the inner wheel 310 and the outer wheel 320 in the transverse direction of the frame 100. The first wheel gear 511 has a central shaft coaxial with the central shaft of the inner wheel 310.

The first guide 512 extends to be curved with a predetermined curvature in a radial direction of the first wheel gear 511. In one embodiment, the first guide 512 may be provided in the form of a through-hole vertically extending through both surfaces of the first wheel gear 511. The first guide 512 has the shape of an arc with a predetermined curvature in cross-section, and has opposite ends separated a predetermined distance from each other in the radial direction of the first wheel gear 511. The first guide 512 includes multiple first guides arranged at certain intervals in a circumferential direction of the first wheel gear 511. The diameter adjustment portion 330 is connected to the inside of the first guide 512 to be slidable in an extension direction of the first guide 512. When the first wheel gear 511 is rotated in the first direction by the second power transmission member 420, the first guide 512 reduces the diameter of the wheel assembly 300 by sliding the diameter adjustment portion 330 toward an inner end of the first guide 512 in the radial direction of the first wheel gear 511.

The second mode switching member 520 is connected to the other second power transmission member. The second mode switching member 520 is rotated in the first direction by reverse torque of the drive unit 200 to extend the diameter of the wheel assembly 300. After extending the diameter of the wheel assembly 300, the second mode switching member 520 rotates both the first mode switching member 510 and the wheel assembly 300 in the first direction to drive the wheel assembly 300 in the traveling direction thereof.

In one embodiment, the second mode switching member 512 includes a second wheel gear 521 and a second guide 522.

The second wheel gear 521 is meshed with the other second power transmission member 420. In one embodiment, the second wheel gear 521 is provided in the form of a spur gear and has an outer peripheral surface engaged with the other second power transmission member 420 (the second power transmission members on the left in FIG. 2). The second wheel gear 521 is disposed inside the inner wheel 310 and the outer wheel 320 in the transverse direction of the frame 100. The second wheel gear 521 has a central shaft coaxial with the central shaft of the inner wheel 310.

The second guide 522 extends to be curved with a predetermined curvature in a radial direction of the second wheel gear 521. The second guide 522 has a curvature opposite to that of the first guide 512. In one embodiment, the second guide 522 may be provided in the form of a through-hole vertically extending through both surfaces of the second wheel gear 521. The second guide 522 has the shape of an arc with a predetermined curvature in cross-section, and has opposite ends separated a predetermined distance from each other in the radial direction of the second wheel gear 521. The second guide 522 is formed such that a rate of change of the slope of a tangent line thereto from one end thereof toward the other end thereof has a sign opposite to that of the first guide 512. The second guide 522 includes multiple second guides arranged at certain intervals in a circumferential direction of the second wheel gear 521. The diameter adjustment portion 330 is connected to the inside of the second guide 522 to be slidable in an extension direction of the second guide 522. When the second wheel gear 521 is rotated in the first direction by the second power transmission member 420, the second guide 522 extends the diameter of the wheel assembly 300 by sliding the diameter adjustment portion 330 toward an outer end of the second guide 522 in the radial direction of the second wheel gear 521.

Next, an operation process of the driving apparatus 1 having transformable wheels according to the embodiment will be described in detail.

Figure 9:
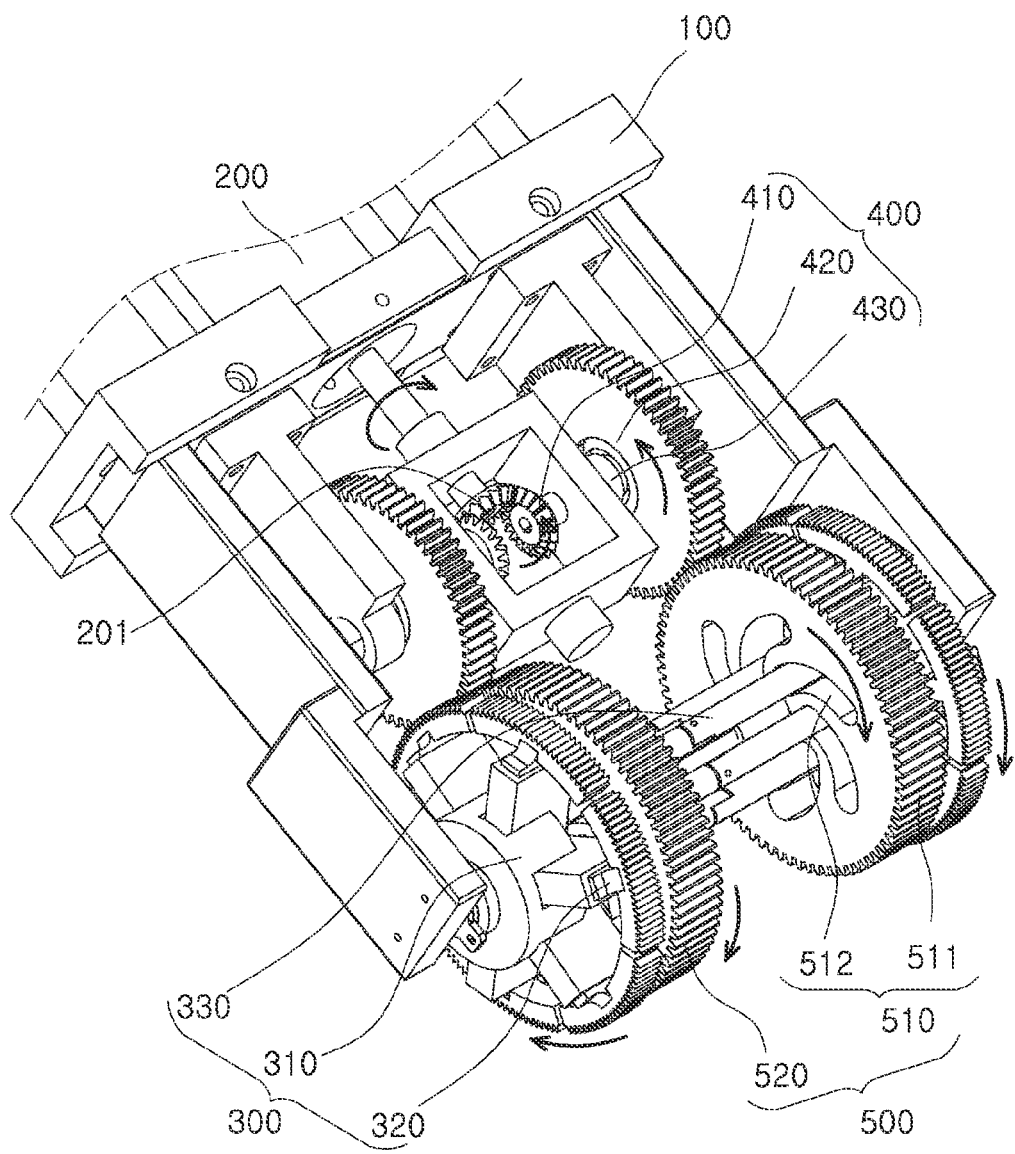
FIG. 9 is a view schematically illustrating operation of the driving apparatus with respect to forward torque of a drive unit according to one embodiment of the present invention.

FIG. 9 is a view schematically illustrating operation of the driving apparatus with respect to forward torque of the drive unit according to one embodiment of the present invention.

For convenience of description, it is assumed that forward torque generated by the drive unit 200 is clockwise torque in FIG. 9 and reverse torque generated by the drive unit 200 is counterclockwise torque in FIG. 9.

When the drive unit 200 generates forward torque, among the pair of first power transmission members 410 connected to the output gear 201, the first power transmission member 410 on the right (in FIG. 9) is rotated counterclockwise (in FIG. 9) and the first power transmission member 410 on the left side is rotated clockwise.

As the first power transmission member 410 on the right is rotated counterclockwise, the transmission adjustment portion 430 on the right (in FIG. 9) among the pair of transmission adjustment portions 430 is switched to a position preventing relative rotation of the inner and outer rings thereof to transmit torque of the first power transmission member 410 to the second power transmission member 420. As the first power transmission member 410 on the left is rotated clockwise, the transmission adjustment portion 430 on the left (in FIG. 9) among the pair of transmission adjustment portions 430 is switched to a position permitting relative rotation of the inner and outer rings thereof to prevent transmission of torque of the first power transmission member 410 to the second power transmission member 420.

As a result, only the second power transmission member 420 on the right (in FIG. 9) among the pair of second power transmission members 420 is rotated counterclockwise in conjunction with the first power transmission member 410, and the second power transmission member 420 on the left (in FIG. 9) remains rotatable relative to the first power transmission member 410. That is, the forward torque generated by the drive unit 200 is transmitted to the first mode switching member 510 through the second power transmission member 420 on the right among the pair of second power transmission members 420.

The first wheel gear 511 is rotated in the first direction by the torque transmitted to the first mode switching member 510.

As the first wheel gear 511 is rotated, the diameter adjustment portion 330 is slid toward an inner end of the first guide 512 in the radial direction of the first wheel gear 511, among two ends of the first guide 512. At the same time, the diameter adjustment portion 330 is slid toward an inner end of the second guide 522 in the radial direction of the second wheel gear 521, among two ends of the second guide 522.

The multiple diameter adjustment portions 330 are moved toward the central shaft of the inner wheel 310 to slide the outer wheel 320 inwards in the radial direction of the inner wheel 310, whereby the wheel assembly 300 is reduced in diameter.

When the first wheel gear 511 continues to be rotated in the first direction and the diameter of the wheel assembly 300 is fully reduced, the diameter adjustment portion 330 contacts the end of the first guide 512 and the end of the second guide 522.

The diameter adjustment portion 330 not allowed to slide inside the first guide 512 and the second guide 522 is rotated in the first direction in conjunction with rotation of the first wheel gear 511 to rotate the inner wheel 310 and the second wheel gear 521 in the first direction.

As the inner wheel 310 is rotated in the first direction, the wheel assembly 300 travels forwards on the ground.

Since the second power transmission member 420 on the left (in FIG. 9) among the pair of second power transmission members 420 remains rotatable relative to the first power transmission member 410, the second wheel gear 521 engaged with the second power transmission member 420 on the left among the pair of second power transmission members 420 can be rotated in the first direction in conjunction with the inner wheel 310 without any particular interference.

Figure 10:
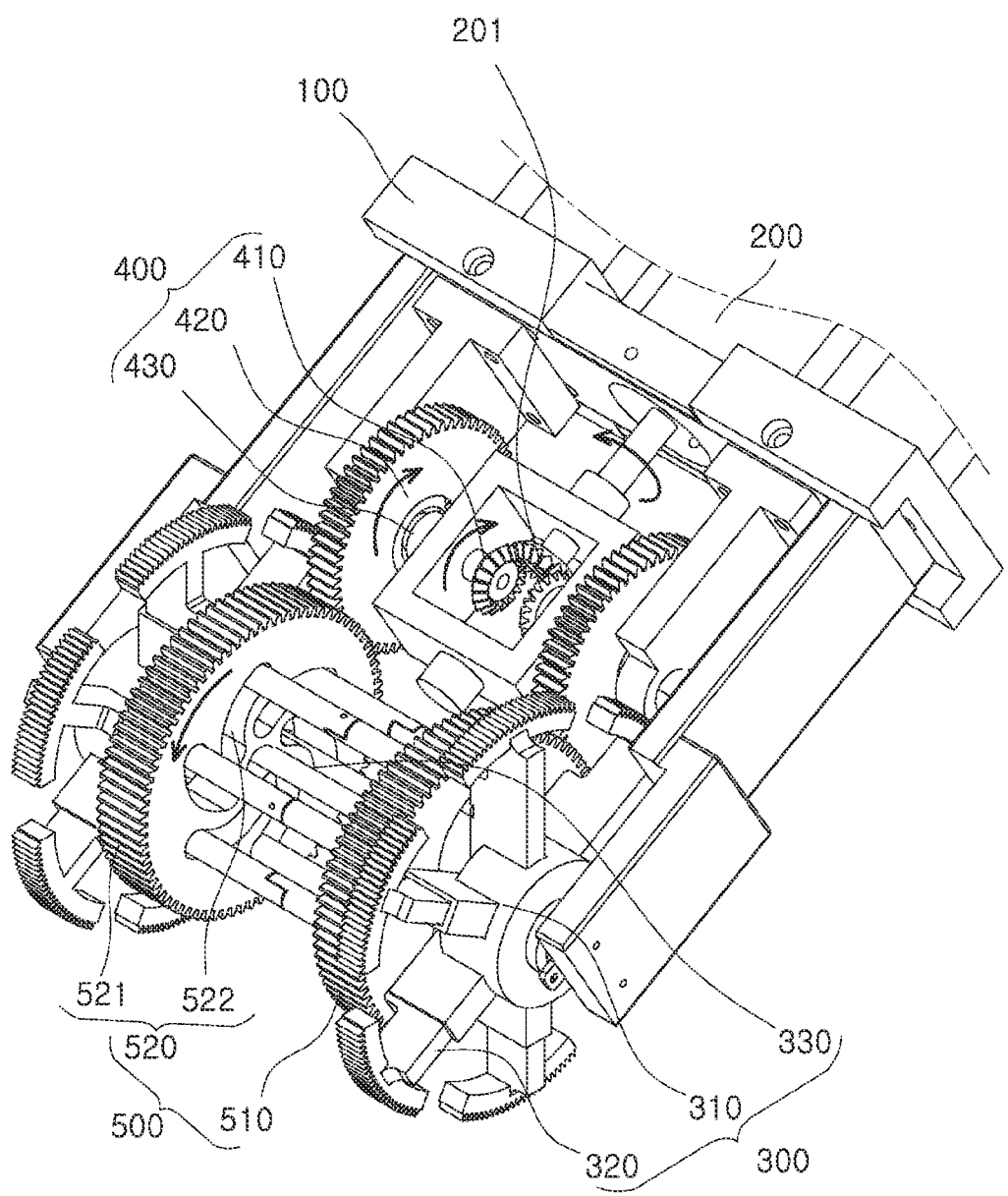
FIG. 10 is a view schematically illustrating operation of the driving apparatus with respect to reverse torque of the drive unit according to one embodiment of the present invention.

FIG. 10 is a view schematically illustrating operation of the driving apparatus with respect to reverse torque of the drive unit according to one embodiment of the present invention.

When the drive unit 200 generates reverse torque, the first power transmission member 410 on the right (in FIG. 10) among the pair of first power transmission members 410 connected to the output gear 201 is rotated counterclockwise (in FIG. 10, clockwise in FIG. 9), and the first power transmission member 410 on the left is rotated clockwise (in FIG. 10, counterclockwise in FIG. 9).

As the first power transmission member 410 on the left is rotated clockwise, the transmission adjustment portion 430 on the left (in FIG. 10) among the pair of transmission adjustment portions 430 is switched to a position preventing relative rotation of the inner and outer rings thereof to transmit torque of the first power transmission member 410 to the second power transmission member 420. As the first power transmission member 410 on the right is rotated counterclockwise, the transmission adjustment portion 430 on the right (in FIG. 10) among the pair of transmission adjustment portions 430 is switched to a position permitting relative rotation of the inner and outer rings thereof to prevent transmission of torque of the first power transmission member 410 to the second power transmission member 420.

Accordingly, only the second power transmission member 420 on the left (in FIG. 10) among the pair of second power transmission members 420 is rotated clockwise in conjunction with the first power transmission member 410, and the second power transmission member 420 on the right (in FIG. 10) remains rotatable relative to the first power transmission member 410. That is, the reverse torque generated by the drive unit 200 is transmitted to the second mode switching member 520 through the second power transmission member 420 on the left among the pair of second power transmission members 420.

The second wheel gear 521 is rotated in the first direction by the torque transmitted to the second mode switching member 520.

As the second wheel gear 521 is rotated, the diameter adjustment portion 330 is slid toward an outer end of the second guide 522 in the radial direction of the second wheel gear 521 among two ends of the second guide 522. At the same time, the diameter adjustment portion 330 is slid toward an outer end of the first guide 512 in the radial direction of the first wheel gear 511 among two ends of the first guide 512.

The multiple diameter adjustment portions 330 are moved in a direction away from the central shaft of the inner wheel 310 to slide the outer wheel 320 outwards in the radial direction of the inner wheel 310, whereby the diameter of the wheel assembly 300 is extended.

When the second wheel gear 521 continues to be rotated in the first direction and the diameter of the wheel assembly 300 is fully extended, the diameter adjustment portion 330 contacts the end of the first guide 512 and the end of the second guide 522.

The diameter adjustment portion 330 not allowed to slide inside the first guide 512 and the second guide 522 is rotated in the first direction in conjunction with rotation of the second wheel gear 521 to rotate the inner wheel 310 and the first wheel gear 511 in the first direction.

As the inner wheel 310 is rotated in the first direction, the wheel assembly 300 travels forwards on the ground.

Since the second power transmission member 420 on the right (in FIG. 10) among the pair of second power transmission members 420 remains rotatable relative to the first power transmission member 410, the first wheel gear 511 engaged with the second power transmission member 420 on the left among the pair of second power transmission members 420 can be rotated in the first direction in conjunction with the inner wheel 310 without any particular interference.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

Therefore, the scope of the present invention should be defined by the appended claims.

The invention claimed is:

1. A driving apparatus having transformable wheels, comprising:
a drive unit generating forward/reverse torque;
a wheel assembly traveling on a ground by receiving torque from the drive unit, the wheel assembly being variable in a diameter;
a power transmission transmitting the forward/reverse torque generated by the drive unit to the wheel assembly in only one direction; and
a mode switching unit changing the diameter of the wheel assembly depending on a rotation direction of the drive unit,
wherein the wheel assembly comprises:
a pair of inner wheels;
multiple outer wheels rotated in conjunction with the inner wheel and connected to the inner wheel to be slidable in a radial direction of the inner wheel; and
a diameter adjustment portion extending from the outer wheel and sliding the outer wheel with external force applied from the mode switching unit, and
wherein the diameter adjustment portion extends in a direction parallel to a central shaft of the wheel assembly and has opposite ends respectively connected to a pair of outer wheels disposed on the respective inner wheels.

2. The driving apparatus according to claim 1, wherein the power transmission is disposed between the drive unit and the wheel assembly, and the mode switching unit is disposed between the power transmission and the wheel assembly.

3. The driving apparatus according to claim 1, wherein the multiple outer wheels are arranged in a circumferential direction of the inner wheel.

4. The driving apparatus according to claim 1, wherein the power transmission comprises:
a pair of first power transmission members rotated in opposite directions by torque of the drive unit;
a pair of second power transmission members connected to the mode switching unit and rotated by torque received from the respective first power transmission members; and
a transmission adjustment portion disposed between the first power transmission member and the second power transmission member to selectively permit torque transmission between the first power transmission member and the second power transmission member depending on a rotation direction of the first power transmission member.

5. The driving apparatus according to claim 4, wherein the pair of first power transmission members is engaged with opposite sides of an output gear rotated in conjunction with an output shaft of the drive unit, respectively.

6. The driving apparatus according to claim 4, wherein the transmission adjustment portion is a one-way bearing.

7. The driving apparatus according to claim 4, wherein the mode switching unit comprises:
a first mode switching member connected to one of the pair of second power transmission members and rotated by the forward torque of the drive unit to reduce the diameter of the wheel assembly; and
a second mode switching member connected to the other second power transmission member and rotated by the reverse torque of the drive unit to extend the diameter of the wheel assembly.

8. The driving apparatus according to claim 7, wherein the first mode switching member and the second mode switching member are rotated in a same direction to reduce or extend the diameter of the wheel assembly.

9. The driving apparatus according to claim 8, wherein the first mode switching member rotates the second mode switching member and the wheel assembly in a first direction after reducing the diameter of the wheel assembly while rotating in the first direction.

10. The driving apparatus according to claim 8, wherein the second mode switching member rotates the first mode switching member and the wheel assembly in a first direction after extending the diameter of the wheel assembly while rotating in the first direction.

11. The driving apparatus according to claim 8, wherein the first mode switching member comprises:
a first wheel gear meshed with one of the pair of second power transmission members; and a first guide extending in a radial direction of the first wheel gear to be curved with a predetermined curvature and allowing the diameter adjustment portion to be slidably connected to the first guide, and wherein the second mode switching member comprises:
a second wheel gear meshed with the other second power transmission member; and
a second guide extending in a radial direction of the second wheel gear to be curved with a curvature opposite to the curvature of the first guide and allowing the diameter adjustment portion to be slidably connected to the second guide.

12. The driving apparatus according to claim 11, wherein the first guide comprises multiple first guides arranged at certain intervals in a circumferential direction of the first wheel gear and the second guide comprises multiple second guides arranged at certain intervals in a circumferential direction of the second wheel gear.

13. The driving apparatus according to claim 11, wherein the first guide allows the diameter adjustment portion to slide toward a central shaft of the inner wheel when the first wheel gear is rotated in a first direction by the second power transmission member.

14. The driving apparatus according to claim 11, wherein the second guide allows the diameter adjustment portion to slide in a direction away from a central shaft of the inner wheel when the second wheel gear is rotated in a first direction by the second power transmission member.

15. A driving apparatus having transformable wheels, comprising:
a drive unit generating forward/reverse torque;
a wheel assembly traveling on a ground by receiving torque from the drive unit, the wheel assembly being variable in a diameter;
a power transmission transmitting the forward/reverse torque generated by the drive unit to the wheel assembly in only one direction; and
a mode switching unit changing the diameter of the wheel assembly depending on a rotation direction of the drive unit, wherein the wheel assembly comprises a diameter adjustment portion extending from an outer wheel and sliding the outer wheel with external force applied from the mode switching unit, and wherein the diameter adjustment portion extends in a direction parallel to a central shaft of the wheel assembly and has opposite ends respectively connected to a pair of outer wheels disposed on a respective inner wheel of a pair of inner wheels.

16. The driving apparatus according to claim 15, wherein the power transmission is disposed between the drive unit and the wheel assembly, and the mode switching unit is disposed between the power transmission and the wheel assembly.

17. The driving apparatus according to claim 15, wherein the multiple outer wheels are arranged in a circumferential direction of the inner wheel.

18. The driving apparatus according to claim 15, wherein the power transmission comprises:
a pair of first power transmission members rotated in opposite directions by torque of the drive unit;
a pair of second power transmission members connected to the mode switching unit and rotated by torque received from the respective first power transmission members; and
a transmission adjustment portion disposed between the first power transmission member and the second power transmission member to selectively permit torque transmission between the first power transmission member and the second power transmission member depending on a rotation direction of the first power transmission member.

* * * * *